US008477867B2

United States Patent
Yang et al.

(10) Patent No.: US 8,477,867 B2
(45) Date of Patent: Jul. 2, 2013

(54) METHOD AND APPARATUS FOR COOPERATIVE MIMO TRANSMISSION OPERATION IN MULTICELL WIRELESS NETWORK

(75) Inventors: Suck Chel Yang, Anyang-si (KR); Dong Ku Kim, Seoul (KR); Yo Han Kim, Seoul (KR); Jang Hoon Yang, Seoul (KR); Hyung Tae Kim, Anyang-si (KR); Hyuk Jin Chae, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 272 days.

(21) Appl. No.: 12/997,209

(22) PCT Filed: Sep. 3, 2009

(86) PCT No.: PCT/KR2009/004978
§ 371 (c)(1),
(2), (4) Date: Dec. 9, 2010

(87) PCT Pub. No.: WO2010/035963
PCT Pub. Date: Apr. 1, 2010

(65) Prior Publication Data
US 2011/0090945 A1    Apr. 21, 2011

(30) Foreign Application Priority Data
Sep. 26, 2008 (KR) .................. 10-2008-0094767

(51) Int. Cl.
*H04B 7/02* (2006.01)
(52) U.S. Cl.
USPC ........................................... 375/267
(58) Field of Classification Search
USPC ................................. 375/260, 267
See application file for complete search history.

(56) References Cited

U.S. PATENT DOCUMENTS

| 2007/0280175 A1 | 12/2007 | Cheng et al. |
| 2008/0025336 A1* | 1/2008 | Cho et al. ................. 370/432 |
| 2009/0010359 A1* | 1/2009 | Hwang et al. ............ 375/297 |
| 2011/0274200 A1* | 11/2011 | Lee et al. ................. 375/295 |
| 2012/0257685 A1* | 10/2012 | Khojastepour et al. ... 375/267 |

FOREIGN PATENT DOCUMENTS
KR    10-2006-0096360 A    9/2006

OTHER PUBLICATIONS

Skjevling et al., "Precoding for Distibuted Space-Time Codes in Cooperative Diversity-Based Downlink", In: Proceedings of 2008 IEEE International Conference on Communications, Jun. 2006, pp. 1265-1270.
XI et al., "SINR-MAX Cooperative Beamforming for Multiuser MIMO-AFDM Systems", In: Proceedings of 2008 IEEE International Conference on Acoustics, Speech and Signal Processing, Apr. 2008, pp. 3237-3240.

* cited by examiner

*Primary Examiner* — Don N Vo
(74) *Attorney, Agent, or Firm* — Birch, Stewart, Kolasch & Birch, LLP

(57) ABSTRACT

A method and apparatus of configuring a multi-cell precoding matrix for a multiple input multiple output (MIMO) operation in a wireless communication system in which a plurality of base stations participate in cooperative communication is provided. A multi-cell precoding matrix is configured using one or more single-cell precoding matrices, and wherein coefficients to be multiplied by the single-cell precoding matrices satisfy a condition in which the product between the multi-cell precoding matrix and a Hermitian matrix of the multi-cell precoding matrix is a unitary matrix. According to the embodiment of the present invention, it is not necessary for all base stations to perfectly know channel information. In addition, a feedback overhead is not high, and complexity is low.

7 Claims, 2 Drawing Sheets

Fig. 1
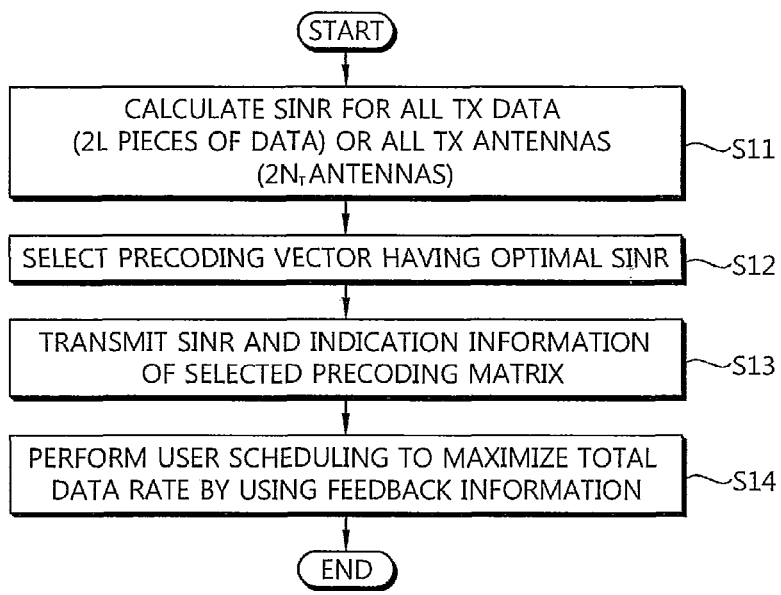
Fig. 2
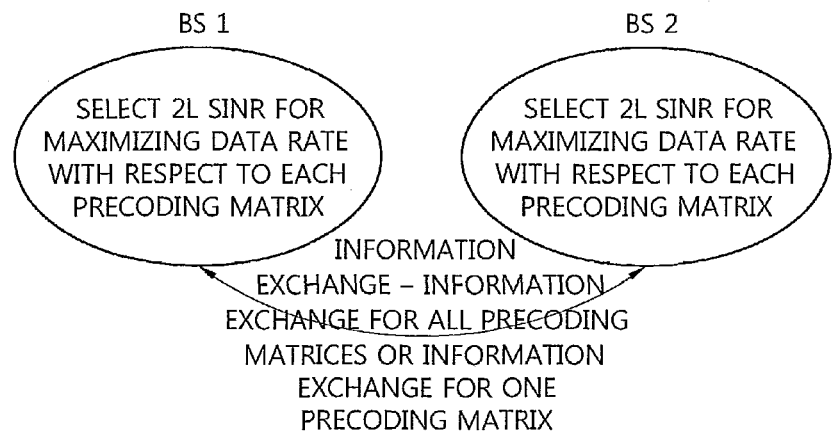
Fig. 3

METHOD AND APPARATUS FOR COOPERATIVE MIMO TRANSMISSION OPERATION IN MULTICELL WIRELESS NETWORK

TECHNICAL FIELD

The present invention relates to wireless communications, and more particularly, to a method and apparatus for a multiple input multiple output (MIMO) operation in a multi-cell wireless network in which a plurality of base stations participate in cooperative communication.

BACKGROUND ART

Recently, with the generalization of information communication services, the introduction of various multimedia services, and the advent of high-quality services, a demand on wireless communication services has been rapidly increased. Various multiple antenna systems are proposed to provide high-speed, high-quality data services in wireless communication. In the multiple antenna system, a transmitter and a receiver use multiple antennas. The multiple antenna system is also referred to as a multiple input multiple output (MIMO) system.

One example of the MIMO system is a multi-user (MU) MIMO system for allowing multiple users to effectively use spatial resources. Many techniques have been proposed to increase channel capacity in the MU MIMO system, and one of them is a dirty paper coding (DPC) scheme. According to the DPC scheme, data of other users is removed in advance by a base station (BS) when the data acts as interference to each user, and thus interference from other users is reduced. Therefore, the MIMO system can provide maximum channel capacity. However, the DPC scheme has a problem in that it is difficult to be implemented in an actual MIMO system since not only a transmitting end requires much channel information but also computational complexity is high.

One example of a method for increasing channel capacity of the MU MIMO system is a per user unitary and rate control (PU$^2$RC) scheme in which spatial resources are allocated simultaneously to different users. The PU$^2$RC scheme is proposed as a contribution document entitled "Downlink MIMO for EUTRA" of 3GPP TSG RAN WG1 #44/R1-060335 by Samsung Electronics Ltd. According to this scheme, each user selects a precoding matrix capable of maximizing a channel transfer rate of each user from a plurality of precoding matrices having an orthogonal basis, and feeds back a signal to interference plus noise ratio (SINR) and an index of the selected precoding matrix to a BS. On the basis of information fed back from each user, the BS determines and transmits a user and a precoding matrix for maximizing a total data rate.

The PU$^2$RC scheme uses a spatial multi-user diversity to increase system capacity, and has an advantage in that it can be implemented in an actual MIMO system due to low computational complexity. However, the PU$^2$RC scheme determines the user and the precoding matrix by considering only a single-cell environment and does not consider a multi-cell environment where inter-cell interference occurs. In particular, since a user located in a cell edge experiences a lot of interferences from neighboring cells, it is difficult to ensure a data rate of a specific level or higher when inter-cell interference is not considered.

Several schemes have currently been discussed to solve the problem of inter-cell interference occurring in the multi-cell environment. One example of these schemes is a BS cooperation scheme. A MIMO operation technique based on cooperation between BSs has recently been proposed in many papers. For example, a paper entitled "Base Station Cooperation for Multiuser MIMO: Joint Transmission and BS Selection" by HongyuanZhang, HuaiyuDai, and QuanZhou describes a DPC scheme based on BS cooperation or joint zero forcing beam forming (ZF-BF) scheme. According to this paper, all BSs have to perfectly know channel information in order to apply the DPC scheme based on BS cooperation or the joint ZF-BF scheme. Therefore, it is almost impossible to implement the BS cooperation scheme in an actual system due to feedback or complexity.

The BS cooperation scheme is also discussed in a paper entitled "Receiver-Enhanced Cooperative Spatial Multiplexing with Hybrid Channel Knowledge" by Hilde Skjevling, David Gesbert, and Are HjØrungnes. In this paper, a method for BS cooperation is proposed under the assumption that channel information of a neighboring cell uses only statistic information, and channel information of a cell for receiving a service is perfectly known. However, since the channel information of the cell for receiving the service of the BS is assumed to be perfectly known, it is also difficult to apply the scheme proposed in this paper to an actual system.

DISCLOSURE OF INVENTION

Technical Problem

The present invention provides a method of configuring a precoding matrix for a cooperative multiple input multiple output (MIMO) operation which considers a multi-cell environment where inter-cell interference may occur and which can be implemented in an actual wireless communication system, and a transmission method using the precoding matrix.

The present invention also provides a method of exchanging information between base stations (BSs) for a cooperative MIMO operation which considers a multi-cell en-vironment where inter-cell interference may occur and which can be implemented in an actual wireless communication system.

The present invention also provides a user scheduling method for a cooperative MIMO operation which considers a multi-cell environment where inter-cell interference may occur and which can be implemented in an actual wireless communication system.

Solution to Problem

In an aspect, a method of configuring a multi-cell precoding matrix for a multiple input multiple output (MIMO) operation in a wireless communication system in which a plurality of base stations participate in cooperative communication, wherein the multi-cell precoding matrix is configured using one or more single-cell precoding matrices, and wherein coefficients to be multiplied by the single-cell precoding matrices satisfy a condition in which the product between the multi-cell precoding matrix and a Hermitian matrix of the multi-cell precoding matrix is a unitary matrix.

In another aspect, a feedback method for a multiple input multiple output (MIMO) operation in a wireless communication system in which a plurality of base stations participate in cooperative communication, the method comprising: measuring signal to interference plus noise ratios (SINRs) for all transmit data; selecting a multi-cell precoding matrix having an optimal SINR from the measured SINRs; and transmitting indication information for the selected multi-cell precoding matrix and an SINR measured for the selected multi-cell precoding matrix.

In another aspect, a user scheduling method for a multiple input multiple output (MIMO) operation in a wireless communication system in which a plurality of base stations participate in cooperative communication, the method comprising: receiving a feedback of indication information regarding a multi-cell precoding matrix and a signal to interference plus noise ratio (SINR) measured for the multi-cell precoding matrix from a plurality of users; selecting a multi-cell precoding matrix for maximizing a total data rate by using information fed back; and assigning the plurality of users to respective precoding vectors of the selected multi-cell precoding matrix.

Advantageous Effects of Invention

An embodiment of the present invention considers a multi-cell environment where inter-cell interference may occur unlike in the conventional per user unitary and rate control ($PU^2RC$) considering only a single-cell environment. Therefore, a multiple input multiple output (MIMO) operation can be more accurately implemented in an actual wireless communication system. According to the embodiment of the present invention, it is not necessary for all base stations to perfectly know channel information. In addition, a feedback overhead is not high, and complexity is low. Therefore, the MIMO operation can be implemented more properly in an actual wireless communication system.

BRIEF DESCRIPTION OF DRAWINGS

FIG. 1 is a diagram showing an example of a multi-cell precoding matrix according to an embodiment of the present invention for a multiple input multiple output (MIMO) operation in a wireless communication system in which two base stations cooperate with each other.

FIG. 2 is a flowchart showing an example of a feedback method according to an embodiment of the present invention for a MIMO operation in a multi-cell base station cooperative wireless communication system.

FIG. 3 is a diagram showing a user scheduling scheme through information exchange according to an embodiment of the present invention for a MIMO operation in a two-cell base station cooperative communication system.

MODE FOR THE INVENTION

Figure 4:
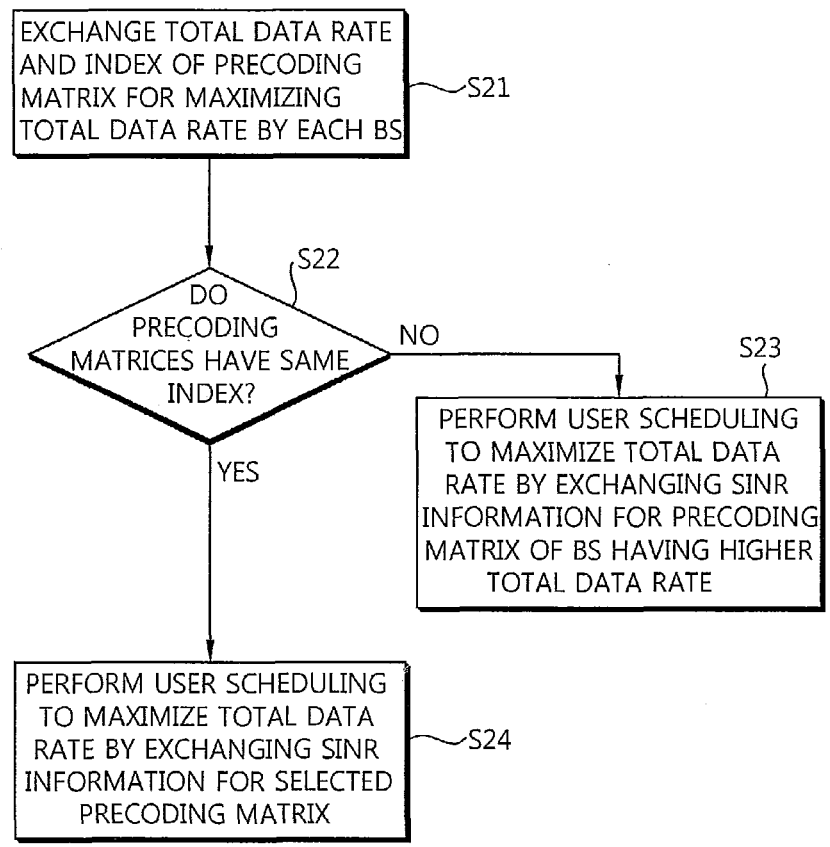
FIG. 4 is a flowchart showing an example of an information exchange procedure between base stations according to an embodiment of the present invention for a MIMO operation in a multi-cell base station cooperative wireless communication system.

Hereinafter, embodiments of the present invention will be described in detail with reference to the accompany drawings. A cooperation scheme of two cells in a multi-cell environment will be described in the embodiments described below for exemplary purposes only, and thus the present invention is not limited thereto. The same content described with respect to the cooperation scheme of the two cells can also be applied without much change even in a case where the number of base stations (BSs) participating in cooperation increases. Matters to be considered when the number of BSs increases will be additionally described below.

First, a method of configuring a precoding matrix for a cooperative multiple input multiple output (MIMO) operation will be described according to an embodiment of the present invention.

Each BS has $N_T$ transmit (Tx) antennas. A receiving end (e.g., a user equipment) has $N_R$ receive (Rx) antennas. When $L(\leq N_T)$ pieces of data are transmitted through the Tx antennas, Rx signals in a single-cell environment, not in a multi-cell environment, can be expressed by Equation 1.

$$Y_{k,1} = H_{k,1} W_1 S_1 + H_{k,2} W_2 S_2 + N_k \quad \text{[Equation 1]}$$

Herein, $Y_{k,i}$ denotes an $N_R \times 1$ Rx signal vector of a $k^{th}$ user of an $i^{th}$ cell, $H_{k,i}$ denotes an $N_R \times N_T$ MIMO channel between the $k^{th}$ user and an $i^{th}$ BS, $W_i$ denotes an $N_T \times L$ unitary matrix (i.e., a precoding matrix) of the $i^{th}$ BS, $N_k$ denotes an $N_R \times 1$ noise vector, and $S_i$ denotes an $L \times 1$ Tx symbol vector of the $i^{th}$ BS.

A communication system in which two cells cooperate with each other may be regarded as a single-cell system which has $2 \times N_T$ Tx antennas and which transmits $2 \times L$ pieces of data. Therefore, a precoding matrix for a two-cell cooperative system has to be a $2N_T \times 2L$ unitary matrix (hereinafter, a precoding matrix used in such a cell cooperative system is referred to as a 'multi-cell precoding matrix'), and it is not allowed to directly use an $N_T \times L$ precoding matrix used in the conventional single-cell system (hereinafter, referred to as a 'single-cell precoding matrix').

According to the precoding matrix compliant with the embodiment of the present invention, that is, according to a method of configuring a multi-cell precoding matrix, the multi-cell precoding matrix is created by using the conventional single-cell precoding matrix. For example, a multi-cell precoding matrix for a two-cell cooperative system can be used by using Equation 2.

$$W_{co} = \frac{1}{\sqrt{2}} \begin{bmatrix} \alpha_{11} W_p & \alpha_{12} W_p \\ \alpha_{21} W_q & \alpha_{22} W_q \end{bmatrix} \quad \text{[Equation 2]}$$

or $$W_{co} = \frac{1}{\sqrt{2}} \begin{bmatrix} \alpha_{11} W_p & \alpha_{12} W_q \\ \alpha_{21} W_p & \alpha_{22} W_q \end{bmatrix}$$

Herein, $W_{co}$ denotes a multi-cell precoding matrix, and $W_p$ and $W_q$ respective denote a $p^{th}$ single-cell precoding matrix and a $q^{th}$ single-cell precoding matrix in a single-cell precoding matrix set (i.e., a codebook). According to the embodiment of the present invention, p and q may have the same value. In addition, any combination for allowing $\alpha_{11}, \alpha_{12}, \alpha_{21}, \alpha_{22}$ to satisfy $$W_{co}^H \cdot W_{co} = I_{2L \times 2L}$$

(where I is a unitary matrix) is possible. Herein, $W_{co}^H$ is a Hermitian matrix of $W_{co}$. According to Equation 2, a desired number of $2N_T \times 2L$ unitary matrices (i.e., multi-cell precoding matrices) for BS cooperation can be created by using a single-cell precoding matrix selected by properly combining p and q and by determining $\alpha_{11}, \alpha_{12}, \alpha_{21}, \alpha_{22}$ each of which satisfies $$W_{co}^H \cdot W_{co} = I_{2L \times 2L}$$

For example, assume that the number G of single-cell precoding matrices is 4. In this case, p and q may have any value in the range of 1 to 4. According to the embodiment of the present invention, the number of multi-cell precoding matrices that can be created may be any number less than 16, i.e., a combination of p and q. For the 4 multi-cell precoding matrices, the combination of p and q can be determined to be p=q=1, p=q=2, p=q=3, p=q=4. In addition, each of $\alpha_{11}$, $\alpha_{12}$, $\alpha_{21}$, $\alpha_{22}$ satisfying $$W_{co}^H \cdot W_{co} = I_{2L \times 2L}$$

may be $\alpha_{mn} = \exp(j2\pi(m-1)(n-1)/2)$ (where m and n is 1 or 2). Equation 3 shows examples of a multi-cell precoding matrix that can be created by using Equation 2.

$$\frac{1}{\sqrt{2}}\begin{bmatrix} W_p & -W_p \\ W_q & W_q \end{bmatrix}, \frac{1}{\sqrt{2}}\begin{bmatrix} -W_p & W_p \\ W_q & W_q \end{bmatrix},$$
$$\frac{1}{\sqrt{2}}\begin{bmatrix} W_p & W_p \\ -W_q & W_q \end{bmatrix}, \frac{1}{\sqrt{2}}\begin{bmatrix} W_p & -W_q \\ W_p & W_q \end{bmatrix},$$
$$\frac{1}{\sqrt{2}}\begin{bmatrix} -W_p & W_q \\ W_p & W_q \end{bmatrix}, \frac{1}{\sqrt{2}}\begin{bmatrix} W_p & W_q \\ -W_p & W_q \end{bmatrix}$$
[Equation 3]

A multi-cell precoding matrix $W_{co}$ is obtained using Equation 2 and includes precoding matrices respectively used by two BSs cooperating with each other. For example, a precoding matrix used by a BS 1 may be an upper $N_T \times 2L$ matrix in any one of the multi-cell precoding matrix $W_{co}$, and a precoding matrix used by a BS 2 may be a lower $N_T \times 2L$ matrix of the multi-cell precoding matrix $W_{co,g,1}$. In FIG. 1, a $g^{th}$ multi-cell precoding matrix is indicated by $W_{co,g}$ and precoding matrices respectively used by two cooperative BSs (i.e., the BS 1 and the BS 2) are indicated by $W_{co,g,1}$ and $W_{co,g,2}$.

Next, a feedback method for a MIMO operation will be described with reference to FIG. 2. The feedback method described below uses a multi-cell precoding matrix obtained according to the aforementioned embodiment of the present invention. FIG. 2 is a flowchart showing a feedback method for a cooperative MIMO operation in a multi-cell wireless network according to an embodiment of the present invention.

Referring to FIG. 2, a receiving end obtains signal to interference plus noise ratios (SINRs) for all pieces of Tx data (i.e., 2L pieces of data) or for all Tx antennas (i.e., $2N_T$ antennas) (step S11). The receiving end may be a user equipment. The SINR is obtained using an Rx signal in the receiving end under the assumption that power is equally allocated to antennas transmitting data (i.e., 2L antennas) or all Tx antennas (i.e., $2N_T$ antennas).

When two BSs participate in cooperative communication by using the multi-cell precoding matrix obtained according to the aforementioned embodiment of the present invention, the Rx signal can be expressed by Equation 4.

$$Y_k = (H_{k,1} W_{co,g,1} + H_{k,2} W_{co,g,2}) S_{co} + N_k = [H_{k,1}, H_{k,2}]$$
$$W_{co,g} S_{co} + N_k = H_{eff,g} S_{co} + N_k$$
[Equation 4]

Herein, $S_{co}$ denotes a Tx signal vector having a size of $2L \times 1$, $W_{co,g,i}$ denotes a $g^{th}$ multi-cell precoding matrix used by an $i^{th}$ BS, and $H_{eff,g}$ denotes an effective channel when using the $g^{th}$ multi-cell precoding matrix.

A detailed method of calculating the SINR may differ depending on a type of a receiver used in the user equipment. The receiver may be a zero-forcing (ZF) receiver or a minimum mean squared error (MMSE) receiver. For the ZF receiver, an SINR of an $i^{th}$ stream for a $g^{th}$ multi-cell precoding matrix of a $k^{th}$ user can be expressed by Equation 5. For the MMSE receiver, the SINR of the $i^{th}$ stream for the $g^{th}$ multi-cell precoding matrix of the $k^{th}$ user can be expressed by Equation 6.

$$SINR_{k,g,i} = \frac{1}{\left[\left(\frac{\rho}{2L} H_{eff,g}^H H_{eff,g}\right)^{-1}\right]_{i,i}}$$
[Equation 5]

$$SINR_{k,g,i} = \frac{1}{\left[\left(I_{2L} + \frac{\rho}{2L} H_{eff,g}^H H_{eff,g}\right)^{-1}\right]_{i,i}} - 1$$
[Equation 6]

Herein, $\rho$ denotes a signal to noise ratio (SNR), $I_{2L}$ denotes a $2L \times 2L$ unitary matrix, $H_{eff,g}$ denotes an effective channel when using the $g^{th}$ multi-cell precoding matrix, and $[\bullet]_{i,i}$ denotes a value of an $i^{th}$ diagonal element.

If the number of Rx antennas is 1, an SINR of an $i^{th}$ stream for a $g^{th}$ multi-cell precoding matrix of a $k^{th}$ user of a $1^{st}$ cell can be expressed by Equation 7. On the other hand, in case of using the conventional PU$^2$RC, the SINR of the $i^{th}$ stream for the $g^{th}$ multi-cell precoding matrix of the $k^{th}$ user of the $1^{st}$ cell is expressed by Equation 8 when the number of Rx antennas is 1.

$$SINR_{k,g,i} = \frac{\frac{\rho}{2L}|H_{k,1}W_{co,g,1}(i) + H_{k,2}W_{co,g,2}(i)|^2}{\frac{\rho}{2L}\sum_{j=1,j\neq i}^{2L}|H_{k,1}W_{co,g,1}(j) + H_{k,2}W_{co,g,2}(j)|^2 + 1}$$
[Equation 7]

$$SINR_{k,g,i} = \frac{\frac{\rho}{L}|H_{k,1}W_g(i)|^2}{\frac{\rho}{L}\sum_{j=1,j\neq i}^{L}|H_{k,1}W_g(j)|^2 + \frac{\rho}{L}\sum_{j=1}^{L}|H_{k,2}W_{g'}(j)|^2 + 1}$$
[Equation 8]

In Equations 7 and 8, W(i) denotes an $i^{th}$ column of a precoding matrix W. The second term in the denominator of Equation 8 denotes interference of a neighboring cell and acts as a factor of decreasing an SINR (herein, the SINR of Equation 8 expresses an SINR of a user in the $1^{st}$ cell). On the other hand, in Equation 7, the second term appears both in the denominator and the numerator since it is an SINR for a case of BS cooperation.

Each user (or user equipment) selects a precoding vector having an optimal SINR among SINRs obtained in step S11 (step S12). The precoding vector having the optimal SINR may be one precoding vector capable of maximizing a data rate among 2L spatial precoding vectors under the assumption that power is equally allocated.

For the precoding vector having the optimal SINR and obtained in step S12, the user equipment transmits to the BS an SINR value, indication information of a precoding vector, and indication information of a precoding matrix (step S13). In case of BS cooperation as described in the embodiment of the present invention, each user equipment can receive a data stream corresponding to a smaller value between $N_R$ and 2L, and the smaller value will be expressed hereinafter by 'mim $(N_R, 2L)$'. In step S13, each user equipment transmits index information regarding an SINR value and a precoding vector to the BS according to three methods described below. The index information regarding the precoding vector is an example of indication information regarding a selected precoding matrix. The three methods described below are for exemplary purposes only, and thus the embodiment of the present invention is not limited thereto. It is assumed herein that the number of multi-cell precoding matrices is G.

In the first method, each user equipment transmits to a BS a total of mim($N_R$, 2L) higher SINRs for the G multi-cell precoding matrices and precoding vector indices corresponding to the SINRs. This method is suitable when a feedback link is sufficient since much information is fed back from the user equipment. In this method, a spatial multiplexing (SM) gain and a spatial multi-user diversity (MU) gain can be obtained.

In the second method, for one multi-cell precoding matrix capable of maximizing a data rate among the G multi-cell precoding matrices, each user equipment transmits to a BS a total of mim($N_R$, 2L) higher SINRs and precoding vector indices corresponding to the SINRs. In this method, an SM gain and a spatial MU gain can also be obtained.

In the third method, for one multi-cell precoding matrix capable of maximizing a data rate among the G multi-cell precoding matrices, each user equipment transmits to a BS one SINR for maximizing a data rate and a precoding vector index corresponding to the SINR. In this method, only a spatial MU gain can be obtained.

For the aforementioned three methods, an amount of data (i.e., a feedback amount) transmitted to the BS for each user equipment can be summarized as described in Table 1 below.

TABLE 1

| | | First method | Second method | Third method |
|---|---|---|---|---|
| feedback amount | SINR | G · min($N_R$, 2L) | min($N_R$, 2L) | 1 |
| | Bits | G · min($N_R$, 2L) · $\log_2(2L)$ | min($N_R$, 2L) · [$\log_2(G) + \log_2(2L)$] | $\log_2(G) + \log_2(2L)$ |
| | gain | SM, MU | SM, MU | MU |

Referring continuously to FIG. 2, the BS selects a multi-cell precoding matrix for maximizing a total data rate by integrating information fed back in step S13 (step S14). The selected multi-cell precoding matrix is used in user scheduling by which the BS assigns users to 2L precoding vectors of a corresponding matrix.

A set of precoding vectors fed back from the users to the BS in the aforementioned step S13 may be insufficient to select one multi-cell precoding matrix by the BS in step S14. This is a case where the number of users is insufficient or only some precoding vectors are fed back. For example, assume that 4 precoding vectors exist, and all users perform feedback by selecting only a $1^{st}$ vector or a $2^{nd}$ vector. In this case, the users cannot be assigned to a $3^{rd}$ vector and a $4^{th}$ vector. According to the embodiment of the present invention, the following methods can be used in this case.

In the first method, users are not assigned to precoding vectors for which feedback is not required. The following procedure is performed in this case. First, the BS determines adaptive modulation and coding (AMC) by using an SINR which is first fed back. Then, the BS reports a scheduled precoding vector to a corresponding user, and determines again AMC by receiving a feedback of an SINR depending on the precoding vector.

In the second method, the users are randomly assigned to the precoding vectors for which feedback is not required. In this case, an additionally assigned user may separately receive a feedback of an SINR and/or the additionally assigned user may use AMC which always shows a low rate.

In the third method, the number L of pieces of data to be transmitted is adaptively determined so that the users can perform feedback for all precoding vectors. In this case, the BS may adaptively select the number L according to average channel information and the number of users, and may sched-ule the users. Further, the BS may regulate the number L according to a scheduling result, and such a procedure may be repeated until all precoding vectors are scheduled.

According to these methods, each BS can assign the users to the 2L precoding vectors even if a set of precoding vectors fed back is insufficient. However, in the first method described above, the number of precoding vectors assigned to the users is less than 2L.

According to the embodiment of the present invention, each user may feed back information to all BSs participating in cooperative communication or may feed back information only to some BSs. Whether a user will feed back information to only some BSs or to all BSs may be determined according to a setting of a wireless communication system, but the present invention is not limited thereto. For example, information may be fed back only to some BSs since a channel condition deteriorates.

For BS cooperative communication according to the embodiment of the present invention, information exchange is necessary between BSs if feedback is achieved from or to only some BSs. In an example described below, a user performs feedback only for one BS when two BSs participate in cooperation communication.

When the user performs feedback only for one BS according to a feedback mechanism determined by the wireless communication system, each BS selects an SINR for maximizing a total data rate with respect to 2L precoding vectors for each precoding matrix (however, the aforementioned three methods may be used when one precoding matrix cannot be configured because the number of users is small, and optionally, the number of selected SINRs may be less than 2L). In this case, each BS exchanges the selected 2L SINRs to finally select 2L SINRs for maximizing a total data rate, and then assigns users to the selected SINRs.

FIG. 3 is a diagram showing a user scheduling scheme through information exchange in a two-cell BS cooperative communication system. The two-cell BS cooperative communication system may be a system in which each user performs feedback only for one BS. Referring to FIG. 3, a BS 1 and a BS 2 may exchange information for all precoding matrices or may exchange information only for one precoding matrix. In addition, each BS (i.e., the BS 1 and the BS 2) performs user scheduling by selecting 2L SINRs for maximizing a data rate with respect to each precoding matrix.

As such, in the user scheduling through information exchange as shown in FIG. 3, the information exchange may be performed on all precoding matrices or may be performed on only one precoding matrix. If information obtained by each BS through feedback cannot configure one precoding matrix, 2L or less number of pieces of information may be exchanged by using one of the aforementioned methods. Hereinafter, a case of exchanging 2L pieces of information will be described.

In the former case, BSs exchange 2L pieces of SINR information for all precoding matrices. Eventually, the number of pieces of exchanged SINR information is G?2L. Each BS determines a precoding matrix for maximizing a total data rate by using the exchanged information together.

In the latter case, a value of the total data rate and an index of the precoding matrix may be first exchanged, and then 2L pieces of SINR information may be exchanged. For example, in the latter case, an operation may be performed according to a method of FIG. 4. First, for a precoding matrix for maximizing a total data rate, each BS exchanges an index of the precoding matrix and information on the total data rate (step S21). Then, each BS determines whether exchanged precoding matrices have the same index (step S22). If the determination result shows that the exchanged precoding matrices have different indices, 2L pieces of SINR information are exchanged for a precoding matrix selected by a BS having a higher total data rate, and then users are scheduled to maximize the total data rate (step S23). On the other hand, if the exchanged precoding matrices have the same index, the 2L pieces of SINR information are exchanged for the precoding matrices, and then the users are scheduled to maximize the total data rate (step S24).

In the embodiment of the present invention described above, two-cell cooperative wireless communication system has been described. However, as described above, the embodiment of the present invention can also be applied to a two or more-cell cooperative wireless communication system, which will be described below.

If the number of BSs participating in cooperative communication is greater than two cells, a multi-cell precoding matrix has to be reconfigured. Equation 9 shows a multi-cell precoding matrix which can be configured when 3 BSs participate in cooperation communication.

$$W_{co}^3 = \frac{1}{\sqrt{3}} \begin{bmatrix} a_{11}W_p & a_{12}W_p & a_{13}W_p \\ a_{21}W_q & a_{22}W_q & a_{23}W_q \\ a_{31}W_r & a_{32}W_r & a_{33}W_r \end{bmatrix}$$ [Equation 9]

or $$W_{co}^3 = \frac{1}{\sqrt{3}} \begin{bmatrix} a_{11}W_p & a_{12}W_q & a_{13}W_r \\ a_{21}W_p & a_{22}W_q & a_{23}W_r \\ a_{31}W_p & a_{32}W_q & a_{33}W_r \end{bmatrix}$$

Herein, $W_p$, $W_q$, and $W_r$ denote single-cell precoding matrices, and $a_{mn}$ is any possible combination for satisfying $$W_{co}^H \cdot W_{co} = I_{3L}$$

(herein, $W_{co}^H$ denotes a Hermitian matrix of $W_{co}$, m=1, 2, 3, and n=1, 2, 3). In addition, p, q, and r may be all identical values, or some or all of them may have different values.

If the number of BSs participating in cooperation is C, the multi-cell precoding matrix may be as expressed by Equation 10. Equation 11 having a form of a discrete Fourier transform (DFT) matrix may be used for $a_{mn}$ of Equation 10. By using Equation 10 and Equation 11, the multi-cell precoding matrix can be configured even if the number of BSs participating in cooperation is greater than or equal to 3. In Equation 10, $W_p$, $W_q$, ..., $W_r$ each denotes a single-cell precoding matrix, $a_{mn}$ may be any combination for satisfying $$W_{co}^H \cdot W_{co} = I_{C \times L}$$

(herein, $W_{co}^H$ is a Hermitian matrix of $W_{co}$, m=1, 2, ..., C, and n=1, 2, ..., C). In addition, p, q, ..., r may have the same value, or some or all of them may be different values.

$$W_{co}^C = \frac{1}{\sqrt{C}} \begin{bmatrix} a_{11}W_p & a_{12}W_p & \cdots & a_{1C}W_p \\ a_{21}W_q & a_{22}W_q & \cdots & a_{2C}W_q \\ \vdots & \vdots & \vdots & \vdots \\ a_{C1}W_r & a_{C2}W_r & \cdots & a_{CC}W_r \end{bmatrix}$$ [Equation 10]

or $$W_{co}^C = \frac{1}{\sqrt{C}} \begin{bmatrix} a_{11}W_p & a_{12}W_q & \cdots & a_{1C}W_r \\ a_{21}W_p & a_{22}W_q & \cdots & a_{2C}W_r \\ \vdots & \vdots & \vdots & \vdots \\ a_{C1}W_p & a_{C2}W_q & \cdots & a_{CC}W_r \end{bmatrix}$$

$$a_{mn} = \exp\left(j\frac{2\pi(m-1)(n-1)}{C}\right)$$ [Equation 11]

If the number of BSs participating in cooperation increases, information exchange performed between BSs has to be performed between all BSs. In this case, each BS may exchange information in a one-to-one manner, or necessary information may be shared by the use of an additional storage or a central server for information exchange. In the latter case, each BS has to transmit all or some information obtained through feedback to the central server.

Although a scheduler for maximizing a data rate has been described above for example in the aforementioned embodiments, the embodiments of the present invention are not limited thereto. For example, other types of schedulers (e.g., a proportional fair scheduler) may also be used. In this case, SINR information obtained through feedback and/or information exchange may be changed into matrix information in a form usable by a corresponding scheduler, and thus users can be assigned in the same manner.

Figure 5:
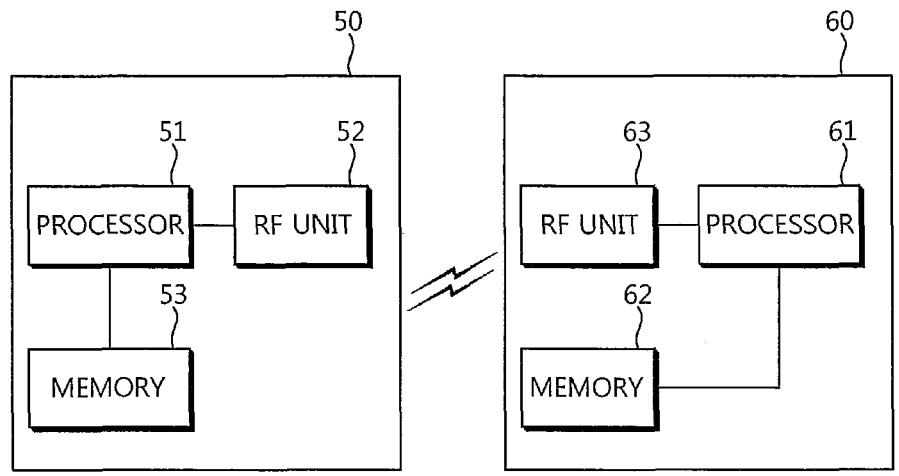
FIG. 5 is a block diagram showing a wireless communication system to implement an embodiment of the present invention.

FIG. 5 is a block diagram showing a wireless communication system to implement an embodiment of the present invention. A BS 50 may include a processor 51, a memory 52 and a radio frequency (RF) unit 53. The processor 51 may be configured to implement proposed functions, procedures and/or methods described in this description. Layers of the radio interface protocol may be implemented in the processor 51. The memory 52 is operatively coupled with the processor 51 and stores a variety of information to operate the processor 51. The RF unit 53 is operatively coupled with the processor 11, and transmits and/or receives a radio signal. A UE 60 may include a processor 61, a memory 62 and a RF unit 63. The processor 61 may be configured to implement proposed functions, procedures and/or methods described in this description. The memory 62 is operatively coupled with the processor 61 and stores a variety of information to operate the processor 61. The RF unit 63 is operatively coupled with the processor 61, and transmits and/or receives a radio signal.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method of configuring a multi-cell precoding matrix for a multiple input multiple output (MIMO) operation in a wireless communication system in which a plurality of base stations participate in cooperative communication, the method comprising:
configuring the multi-cell precoding matrix using one or more single-cell precoding matrices,
wherein coefficients to be multiplied by the single-cell precoding matrices satisfy a condition in which the product between the multi-cell precoding matrix and a Hermitian matrix of the multi-cell precoding matrix is a unitary matrix,
wherein the multi-cell precoding matrix is configured by assigning a same single-cell precoding matrix in a row direction or a column direction of the multi-cell precoding matrix, and
wherein the multi-cell precoding matrix is obtained according to Equation (E-1) and Equation (E-2):

$$W_{co}^C = \frac{1}{\sqrt{C}} \begin{bmatrix} a_{11}W_p & a_{12}W_p & \cdots & a_{1C}W_p \\ a_{21}W_q & a_{22}W_q & \cdots & a_{2C}W_q \\ \vdots & \vdots & \vdots & \vdots \\ a_{C1}W_r & a_{C2}W_r & \cdots & a_{CC}W_r \end{bmatrix} \text{ or}$$ (E-1)

$$W_{co}^C = \frac{1}{\sqrt{C}} \begin{bmatrix} a_{11}W_p & a_{12}W_q & \cdots & a_{1C}W_r \\ a_{21}W_p & a_{22}W_q & \cdots & a_{2C}W_r \\ \vdots & \vdots & \vdots & \vdots \\ a_{C1}W_p & a_{C2}W_q & \cdots & a_{CC}W_r \end{bmatrix}, \text{ and}$$

$$a_{mn} = \exp\left(j\frac{2\pi(m-1)(n-1)}{C}\right),$$ (E-2)

where $W_p, W_q, \ldots, W_r$ each denotes a single-cell precoding matrix, and $a_{mn}$ is any value satisfying $W_{co}^H \cdot W_{co} = I_{C \times L}$, wherein $W_{co}^H$ is a Hermitian matrix of $W_{co}$, $m=1, 2, \ldots, C$, and where C is the number of base stations, $n=1, 2, \ldots, C$, and $I_{C \times L}$ is a C×L unitary matrix).

2. The method of claim 1, wherein if the same single-cell precoding matrix is assigned in the row direction of the multi-cell precoding matrix, all single-cell precoding matrices assigned in the column direction of the multi-cell precoding matrix are different from one another or at least one or more of the single-cell precoding matrices are identical.

3. The method of claim 1, wherein if the same single-cell precoding matrix is assigned in the column direction of the multi-cell precoding matrix, all single-cell precoding matrices assigned in the row direction of the multi-cell precoding matrix are different from one another or at least one or more of the single-cell precoding matrices are identical.

4. A feedback method for a multiple input multiple output (MIMO) operation in a wireless communication system in which a plurality of base stations participate in cooperative communication, the method comprising:
measuring signal to interference plus noise ratios (SINRs) for all transmit data;
selecting one of multi-cell precoding matrices having an optimal SINR from the measured SINRs; and
transmitting indication information for the selected multi-cell precoding matrix and an SINR measured for the selected multi-cell precoding matrix,
wherein in the transmitting of the indication information and the SINR, a total of min ($N_R$, 2L) higher SINRs (where $N_R$ denotes the number of antennas of a receiver, L denotes the number of pieces of transmit data sent from one base station, and min(a,b) denotes a smaller or equal value between a and b) for one of the multi-cell precoding matrices capable of maximizing a data rate among all of the multi-cell precoding matrices and precoding vector indices corresponding to the SINRs are transmitted.

5. The method of claim 4, wherein the wireless communication system performs communication in cooperation of two base stations, and obtains the SINR by the use of a zero-forcing (ZF) receiver according to Equation (E-3):

$$SINR_{k,g,i} = \frac{1}{\left[\left(\frac{\rho}{2L}H_{eff,g}^H H_{eff,g}\right)^{-1}\right]_{i,i}}$$ (E-3)

where $SINR_{k,g,i}$ denotes an SINR of an $i^{th}$ stream for a $g^{th}$ multi-cell precoding matrix of a $k^{th}$ user, $\rho$ denotes a signal to noise ratio (SNR), L denotes the number of transmit data sent from one base station, $H_{eff,g}$ denotes an effective channel when using the $g^{th}$ multi-cell precoding matrix, and $[\bullet]_{i,i}$ denotes a value of an $i^{th}$ diagonal element.

6. The method of claim 4, wherein the wireless communication system performs communication in cooperation of two base stations, and obtains the SINR by the use of a minimum mean square error (MMSE) receiver according to Equation (E-4):

$$SINR_{k,g,i} = \frac{1}{\left[\left(I_{2L} + \frac{\rho}{2L}H_{eff,g}^H H_{eff,g}\right)^{-1}\right]_{i,i}} - 1$$ (E-4)

where $SINR_{k,g,i}$ denotes an SINR of an $i^{th}$ stream for a $g^{th}$ multi-cell precoding matrix of a $k^{th}$ user, L denotes the number of transmit data sent from one base station, $I_{2L}$ denotes a 2L×2L unitary matrix, $\rho$ denotes an SNR, $H_{eff,g}$ denotes an effective channel when using the $g^{th}$ multi-cell precoding matrix, and $[\bullet]_{i,i}$ denotes a value of an $i^{th}$ diagonal element.

7. A feedback method for a multiple input multiple output (MIMO) operation in a wireless communication system in which a plurality of base stations participate in cooperative communication, the method comprising:
measuring signal to interference plus noise ratios (SINRs) for all transmit data;
selecting one of multi-cell precoding matrices having an optimal SINR from the measured SINRs; and
transmitting indication information for the selected multi-cell precoding matrix and an SINR measured for the selected multi-cell precoding matrix,
wherein in the transmitting of the indication information and the SINR, a total of min($N_R$, 2L) higher SINRs (where $N_R$ denotes the number of antennas of a receiver, L denotes the number of pieces of transmit data sent from one base station, and min(a,b) denotes a smaller or equal value between a and b) for all of the multi-cell precoding matrices and precoding vector indices corresponding to the SINRs are transmitted.

* * * * *